(12) United States Patent
Böhm et al.

(10) Patent No.: US 11,274,709 B2
(45) Date of Patent: Mar. 15, 2022

(54) CLUTCH DEVICE FOR TORSIONALLY FLEXIBLE TORQUE TRANSMISSION

(71) Applicant: Stromag GmbH, Unna (DE)

(72) Inventors: Peter Böhm, Unna (DE); Friedrich Faust, Ahlen (DE); Olaf Mikolajczyk, Unna (DE); Daniela Spink, Unna (DE)

(73) Assignee: Stromag GmbH, Unna (DE)

( * ) Notice: Subject to any disclaimer, the term of this patent is extended or adjusted under 35 U.S.C. 154(b) by 18 days.

(21) Appl. No.: 16/833,797

(22) Filed: Mar. 30, 2020

(65) Prior Publication Data
US 2020/0309200 A1 Oct. 1, 2020

(30) Foreign Application Priority Data

Apr. 1, 2019 (DE) ...................... 10 2019 204 615.0

(51) Int. Cl.
*F16D 13/68* (2006.01)
*F16D 3/14* (2006.01)
(Continued)

(52) U.S. Cl.
CPC ............. *F16D 13/68* (2013.01); *F16D 13/38* (2013.01); *F16D 13/646* (2013.01); *F16D 3/14* (2013.01)

(58) Field of Classification Search
CPC .......... F16D 3/14; F16D 13/38; F16D 13/646; F16D 13/68; F16F 15/123–12393
(Continued)

(56) References Cited

U.S. PATENT DOCUMENTS 4,889,218 A * 12/1989 Chasseguet ....... F16F 15/13142
464/68.92
5,000,304 A * 3/1991 Ko/ ck .............. F16F 15/12386
192/53.4
(Continued)

FOREIGN PATENT DOCUMENTS

DE 37 42 794 A1 6/1989
DE 696 07 521 T2 9/2000
(Continued)

OTHER PUBLICATIONS

English (machine) translation of DE 4417660 B4.
(Continued)

*Primary Examiner* — David R Morris
(74) *Attorney, Agent, or Firm* — Reising Ethington P.C.

(57) ABSTRACT

A clutch includes a hub and a flange located radially inside and outside, respectively, with respect to the clutch rotational axis and associated with hub and flange sides of the clutch. A spring elastically supports the hub and flange sides against each other in the circumferential direction in a torque-transmitting manner. A bearing radially supports the hub and flange sides against one another for rotation around the axis and includes an outer ring supporting the hub and an inner ring supported on a bearing pin associated with the flange side. A friction device connects the hub and flange sides in a friction-locked and torque-transmitting manner in the circumferential direction and includes a friction element and a friction surface which are pretensioned against one another in the axial direction. A tensioning device includes a tensioning element that applies force to, and axially pretensions, the friction device and bearing.

16 Claims, 1 Drawing Sheet

(51) Int. Cl.
*F16D 13/38* (2006.01)
*F16D 13/64* (2006.01)

(58) Field of Classification Search
USPC .............................................. 464/68.4–68.41
See application file for complete search history.

(56) References Cited

U.S. PATENT DOCUMENTS

| | | | | |
|---|---|---|---|---|
| 5,617,939 | A | * | 4/1997 | Memmel ............ F16F 15/1207 |
| | | | | 192/204 |
| 5,688,177 | A | * | 11/1997 | Lindner ............ F16F 15/13142 |
| | | | | 192/213.2 |
| 5,873,445 | A | | 2/1999 | Haberbusch et al. |
| 2013/0125700 | A1 | * | 5/2013 | Saeki .................. F16F 15/1395 |
| | | | | 74/572.2 |

FOREIGN PATENT DOCUMENTS

| | | |
|---|---|---|
| DE | 4417660 B4 | 12/2006 |
| DE | 199 55 736 A1 | 8/2008 |
| DE | 102008010994 A1 | 9/2008 |
| RU | 2230954 C2 | 6/2004 |

OTHER PUBLICATIONS

English (machine) translation of DE 102008010994 A1.
English (machine) translation of RU 2230954 C2.
English (machine) translation of DE 199 55 736 A1.
English (machine) translation of DE 696 07 521 T2.
English (machine) translation of DE 37 42 794 A1.

* cited by examiner

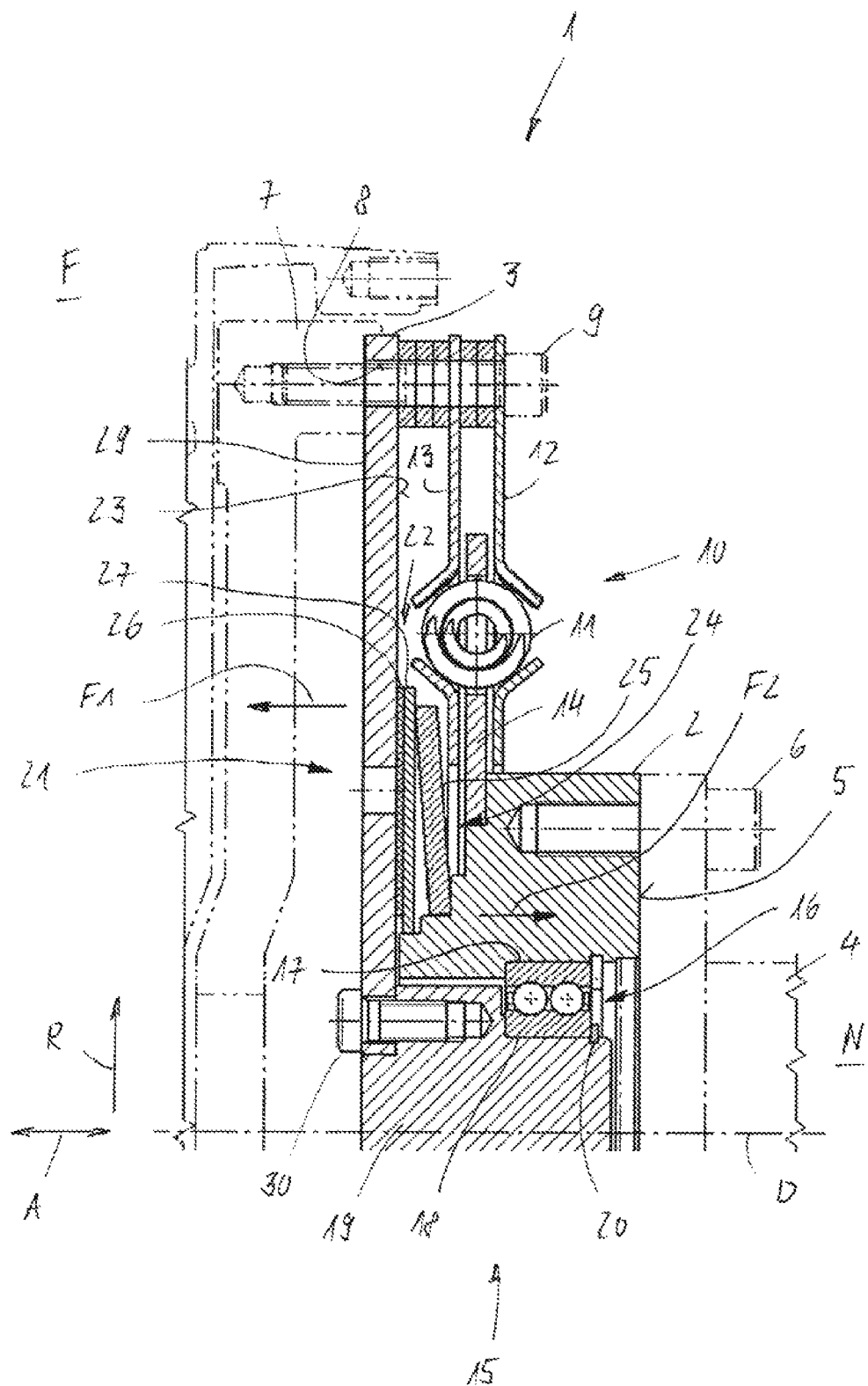

CLUTCH DEVICE FOR TORSIONALLY FLEXIBLE TORQUE TRANSMISSION

BACKGROUND OF THE INVENTION a. Field of the Invention

The invention relates to a clutch device for torsionally flexible torque transmission, comprising a clutch hub located radially inside with respect to a clutch rotational axis and associated with a hub side of the clutch device, a clutch flange located radially outside and associated with a flange side of the clutch device, a spring device by means of which the hub side and the flange side are elastically adjusted with respect to each other in the circumferential direction in a torque-transmitting manner, for which purpose the spring device has at least one spring element which is supported in the circumferential direction at one end on the clutch hub and at the other end on the clutch flange, a bearing device by means of which the hub side and the flange side are radially supported against one another and mounted to rotate around the clutch rotational axis, for which purpose the bearing device has at least one rolling bearing on the outer ring of which the clutch hub is radially supported and the inner ring of which is radially supported on a bearing pin associated with the flange side, and having a friction device by means of which the hub side and the flange side are operatively connected to one other in a friction-locked and torque-transmitting manner in the circumferential direction, for which purpose the friction device has at least one friction element and at least one friction surface which are pretensioned against one another in the axial direction by applying force to form the friction-locked operative connection.

b. Background Art

A clutch device of this type is generally known in the field of drive engineering and is provided for torsionally flexible torque transmission in a drive train. The known clutch device has a radially inner clutch hub and a radially outer clutch flange. The clutch flange and the clutch hub support each other in the circumferential direction in an elastic and torque-transmitting manner by means of a spring device and are therefore elastically twistable relative to one another. For this purpose, the spring device provides a plurality of compression springs which are arranged adjacently in the circumferential direction and each of which is supported at one end on the clutch flange and at the other end on the clutch hub. In order to dampen the elastic twistability between the clutch hub and the clutch flange, a friction device is provided by means of which the hub side and the flange side are connected to one another in the circumferential direction in a friction-locked and torque-transmitting manner. For this purpose, the friction device has at least one friction element and at least one friction surface, which are pressed against one another to form the friction-locked operative connection. In addition, the known clutch device has a bearing device having a rolling bearing. The hub side and the flange side are supported radially against one another by means of the bearing device and mounted to rotate about the clutch rotational axis. For this purpose, the bearing device has at least one rolling bearing.

BRIEF SUMMARY OF THE INVENTION

The object of the invention is to provide a clutch device of the type mentioned at the outset which enables reliable functioning of the bearing device and at the same time has a simple design.

This object is achieved by providing a tensioning device associated with the bearing device and the friction device, said tensioning device having at least one tensioning element by means of which the friction device and the at least one rolling bearing are respectively axially pretensioned by applying force. As a result of the solution according to the invention, the at least one rolling bearing is axially pretensioned, which reduces a tolerance-dependent bearing clearance of the rolling bearing. This can facilitate improved durability and/or reduced wear of the rolling bearing and therefore particularly reliable functioning of the bearing device. The invention provides the tensioning device for pretensioning the rolling bearing. Since the tensioning device is associated according to the invention with both the friction device and the bearing device, the at least one tensioning element has a particularly advantageous multi-function. On the one hand, the tensioning element acts on the friction device and thereby axially pretensions the friction element and the friction surface against one another. On the other hand, the tensioning element acts on the rolling bearing. This allows separate tensioning devices and/or separate tensioning elements for the bearing device and the friction device to be dispensed with and thus a particularly simple design of the clutch device to be achieved. The clutch device is preferably provided for transmitting a torque between a transmission and an engine of a drive train. The clutch hub can be provided in particular for the torque-proof connection to an input shaft of a transmission or an output shaft of a drive motor. Accordingly, the clutch flange can be provided in particular for the torque-proof connection to an input flange of a transmission or an output flange of an engine. The spring device brings about an elastic connection between the flange side and the hub side in the circumferential direction so that drive-related sudden peaks in the torque to be transmitted are not transmitted rigidly, and therefore in sudden peaks, but instead in a shock-absorbing and torsionally flexible manner between the flange side and the hub side. For this purpose, the hub side and the flange side are elastically twistable relative to one another by means of the spring device. The spring device provides the at least one spring element for elastically twistable support between the hub side and the flange side. The at least one spring element is preferably a compression spring. The spring device preferably has a plurality of identical spring elements which are arranged to be spaced apart from each other in the circumferential direction and which each are supported at one end on the clutch hub and at the other end on the clutch flange. This support can be indirect or direct. The bearing device serves in particular for radial support between the flange side and the hub side. The rolling bearing is preferably a radial or angular contact bearing. The rolling bearing can be of single-row or multi-row design. As rolling element, the rolling bearing can in particular have balls, rollers, needles or barrels. The clutch hub can be indirectly or directly supported on the outer ring of the rolling bearing. Likewise, the inner ring can be indirectly or directly supported on the bearing pin. The friction device serves in particular to damp the elastic twistability between the flange side and the hub side. The resulting kinetic energy is converted at least partially into frictional heat by means of the friction device. The friction element can be associated with the clutch hub and the friction surface can be associated with the clutch flange or vice versa. The friction-locked operative connection between the friction element and the friction surface is preferably permanent and not switchable in this respect. The tensioning device is preferably permanently active so that both the friction device and the rolling bearing are permanently pretensioned in the axial direction. The tensioning element can in particular have an elastic spring, which can be embodied, for example, as a coil or disk spring. Force is applied to both the friction device and the rolling bearing in the axial direction by means of the tensioning element. In this case, the tensioning element can respectively act indirectly or directly on the friction device and the rolling bearing.

In embodiments of the invention, one end of the at least one tensioning element brings about a first axial force on the friction device and the other end brings about a second axial force which is opposite the first axial force and is applied to the outer ring and/or the inner ring of the at least one rolling bearing. The first axial force can act indirectly or directly on the friction element or the friction surface. The second axial force is diametrically opposite to the first axial force and acts on the outer ring and/or on the inner ring to pretension the rolling bearing and thus to reduce the bearing clearance. The second axial force preferably acts indirectly or directly on the outer ring.

In a further embodiment of the invention, the friction element is connected to the clutch hub in a torque-proof manner and can be displaced in the axial direction relative to the clutch hub, wherein in the axial direction, one end of the tensioning element acts on a rear side of the friction element and the other end acts on the outer ring of the rolling bearing. In this embodiment of the invention, the friction element is accordingly associated with the hub side, whereas the friction surface is associated with the flange side. The tensioning element acts on the rear side of the friction element, as a result of which the same is pressed against the friction surface in the axial direction and the friction-locked operative connection is formed between the hub side and the flange side. The tensioning element preferably acts directly on the rear side of the friction element. At the other end, the friction element preferably acts only indirectly on the outer ring. For this purpose, the tensioning element can be supported, for example, on the clutch hub, which in turn is supported on the outer ring.

In a further embodiment of the invention, the bearing pin is connected to the clutch flange in a torque-proof manner by means of a radial plate extending in the radial direction, the friction surface being arranged on the radial plate. This embodiment of the invention enables a further simplified design of the clutch device. In this case, the radial plate has a particularly advantageous multifunction. On the one hand, the radial plate serves for the torque-proof connection of the bearing pin to the clutch flange. On the other hand, the radial plate has the friction surface of the friction device. As a result, a number of required components can be reduced, and the aforementioned particularly simple design can thus be achieved. The radial plate is joined at its inner circumference to the bearing pin. In particular, at least one screw connection or a welded connection can be provided for this purpose. At its outer circumference, the radial plate can be joined to the clutch flange. Alternatively, the clutch flange can be formed directly on the radial plate.

In a further embodiment of the invention, the at least one tensioning element is a disk spring. This embodiment of the invention has proven to be particularly space-saving and particularly reliable. If more than one tensioning element is provided, the tensioning elements can each be designed as a disk spring and a disk spring packet can be formed in this way.

BRIEF DESCRIPTION OF THE DRAWINGS

Further advantages and features of the invention result from the claims and also from the following description of a preferred exemplary embodiment of the invention, which is illustrated with reference to the drawings.

FIG. 1 shows a schematic longitudinal sectional view of an embodiment of a clutch device according to the invention.

DETAILED DESCRIPTION OF THE INVENTION

According to FIG. 1, a clutch device 1 is provided for a drive train for torsionally flexible torque transmission and has a clutch hub 2 located radially inside with respect to a clutch rotational axis D and a clutch flange 3 located radially outside.

The clutch hub 2 is associated with a hub side N of the clutch device 1 and is provided in the present case for the torque-proof connection to a transmission input shaft 4 of the drive train only shown schematically. For this purpose, the clutch hub 2 has in the present case a flange surface 5 which faces the transmission input shaft 4 and which is joined by means of a plurality of screw connections 6 arranged adjacently in the circumferential direction to a flange surface of the transmission input shaft 4 which is not described in more detail. However, such a design of the clutch hub 2 is not mandatory and is to be understood as purely exemplary in this respect.

The clutch flange 3 is associated with a flange side F of the clutch device 1 and is provided in the present case for the torque-proof connection to an output flange 7 of a drive motor of the drive train which is shown only schematically. For this purpose, the clutch flange 3 has, in the present case, a plurality of through-bores 8 which are arranged adjacently in the circumferential direction and which are provided for respectively forming a screw connection 9 between the clutch flange 3 and the output flange 7.

The clutch device 1 also has a spring device 10 by means of which the hub side N and the flange side F are elastically supported against one another in a torque-transmitting manner in the circumferential direction. For this purpose, the spring device 10 has, in the present case, a plurality of spring elements 11 which are arranged adjacently in the circumferential direction and which at one end are indirectly supported on the clutch hub 2 and at the other hand are indirectly supported on the clutch flange 3 in a manner not shown in more detail.

In the present case, the spring device 11 has a spring cage 12, 13 for receiving and holding the spring elements 11. The spring cage 12, 13 has a first cage plate 12 and a second cage plate 13. At its outer circumference, the spring cage 12, 13 is joined to the clutch flange 3 in a torque-proof manner by means of the screw connection 9 and is associated with the flange side F in this respect. In addition, the spring device 10 in the present case has a center plate 14 which is arranged in the axial direction A between the first cage plate 12 and the second cage plate 13 and, at its inner circumference, is joined to the clutch hub 2 in a torque-proof manner. The present design and the functioning of the spring device 10 as such are basically known so that further details for this need not be discussed in more detail.

Furthermore, the clutch device 1 has a bearing device 15 by means of which the hub side N and the flange side 5 are supported radially against one another and are mounted to rotate about the clutch rotational axis D. For this purpose, the bearing device 15 has a rolling bearing 16 with an outer ring 17 and an inner ring 18. The clutch hub 2 is supported on the outer ring 17 in the radial direction R. In contrast, the inner ring 18 is supported in the radial direction R on a bearing pin 19 which is associated with the flange side F and is connected to the clutch flange 3 in a torque-proof manner which is described in more detail. For this purpose, the outer ring 18 is fitted together with a bearing seat of the clutch hub 2 which is not described in more detail and which is arranged on a radially inner wall surface of the clutch hub 2. In the axial direction A, the outer ring 17 is positively fixed to the clutch hub 2 by means of an axial securing ring not described in more detail. The inner ring 18 is fitted together with a bearing seat of the bearing pin 19 which is not described in more detail, and is fixed on the bearing pin 19 in the axial direction A by means of an axial securing ring 20. In this respect, the outer ring 17 is associated with the hub side N and the inner ring 18 is associated with the flange side F.

Here, the rolling bearing 16 is in the present case a radial bearing in the form of a two-row grooved ball bearing, but this is not mandatory. Instead of the design provided here, a single-row or multi-row angular ball bearing can be provided, for example, in an embodiment not shown in the drawing.

In addition, the clutch device 1 has a friction device 21 by means of which the hub side N and the flange side F are operatively connected to one another in a friction-locked and torque-transmitting manner in the circumferential direction. For this purpose, the friction device 21 has a friction element 22 and a friction surface 23 which are pretensioned against one another in the axial direction A by applying force to form the friction-locked operative connection.

The spring device 10 ensures that the torque to be transmitted between the flange side F and the hub side N is not transmitted suddenly, for example, but instead in a shock-absorbing and elastic manner in the case of drive-related rough operation and/or torque peaks. Accordingly, the spring device 10 permits an elastic twist between the flange side F and the hub side N or between the clutch flange 3 and the clutch hub 2.

The friction device 21 ensures damping of said rough operation and/or torque peaks. For this purpose, in the case of an elastic twist between the flange side F and the hub side N, arising kinetic energy is converted into frictional heat by a relative sliding movement between the friction element 22 and the friction surface 23 in the circumferential direction and is dissipated in this way.

In addition, a tensioning device 24 associated with the bearing device 15 and the friction device 21 is provided and has at least one tensioning element 25 by means of which the friction device 21 and the at least one rolling bearing 16 are respectively axially pretensioned by applying force.

The pretensioning of the friction device 21 between the hub side N and the flange side F serves to form the friction-locked operative connection. The pretensioning of the rolling bearing 16 serves to reduce a bearing clearance of the rolling bearing 16. Improved durability or reduced wear of the rolling bearing 16 and thus particularly reliable functioning of the bearing device 15 can thereby be achieved. Since the tensioning device 24 is associated with both the bearing device 15 and the friction device 21, a required number of components can in particular be reduced and a particularly simple design of the clutch device 1 can be achieved. Instead of, for example, two separate tensioning elements or tensioning devices, one of which is associated with the friction device 21 and one of which is associated with the bearing device 15, the tensioning device 24 in the present case assumes a particularly advantageous multifunction.

At one end, the at least one tensioning element 25 brings about a first axial force F1 on the friction device 21. At the other end, the tensioning element 25 brings about a second axial force F2 which is opposite the first axial force F1 and acts on the outer ring 17 of the rolling bearing 16 in the present case.

The at least one tensioning element is in the present case a disk spring 25.

The friction element 22 has a friction lining 26 and a friction lining carrier 27 in the present case. The friction lining 26 is in the form of a friction ring which is firmly joined to the friction lining carrier 27. The friction lining carrier 27 is fixed to the clutch hub 2 in a torque-proof manner at its inner circumference and displaceably in the axial direction A.

The at least one tensioning element 25 acts on a rear side of the friction element 22, which is not shown in more detail and which is arranged on the friction lining carrier 27 in the present case. For this purpose, in the region of its outer circumference, the at least one tensioning element 25 rests with its end face on the rear side and thus presses the friction element 22 axially against the friction surface 23. In contrast, in the region of its inner circumference, the at least one tensioning element 25 is fixed to the clutch hub 2 in the axial direction A. The second axial force F2 acts indirectly via the clutch hub 2 on the outer ring 17 and thus moves the latter in the axial direction A while reducing the bearing clearance relative to the inner ring 18.

The bearing pin 19 is operatively connected to the clutch flange 3 in a torque-proof manner by means of a radial plate 29 extended in the radial direction R. Here, the clutch flange 3 is arranged in the present case on an inner circumference of the radial plate 29 and is formed directly thereon. On its inner circumference, the radial plate 29 is joined to the bearing pin 19 in a torque-proof manner by means of at least one screw connection 30. The friction surface 23 is arranged on the radial plate 29. Here, the friction surface 23 is formed in the present case by an annular portion of an end face, not described in more detail, of the radial plate 29 facing the friction element 22 in the axial direction A.

What is claimed is:

1. A clutch device (1) for torsionally flexible torque transmission, comprising:
    a clutch hub (2) which is located radially inside with respect to a clutch rotational axis (D) and associated with a hub side (N) of the clutch device (1);
    a clutch flange (3) located radially outside and associated with a flange side (F) of the clutch device (1);
    a spring device (10) by means of which the hub side (N) and the flange side (F) are elastically supported against each other in the circumferential direction in a torque-transmitting manner, for which purpose the spring device (10) has at least one spring element (11) which is supported in the circumferential direction at one end on the clutch hub (2) and at the other end on the clutch flange (3);
    a bearing device (15) by means of which the hub side (N) and the flange side (F) are radially supported against one another and mounted to rotate around the clutch rotational axis (D), for which purpose the bearing device (15) has at least one rolling bearing (16) on the outer ring (17) of which the clutch hub (2) is radially supported and the inner ring (18) of which is radially supported on a bearing pin (19) associated with the flange side (F); and,
    a friction device (21) by means of which the hub side (N) and the flange side (F) are operatively connected to one other in a friction-locked and torque-transmitting manner in the circumferential direction, for which purpose the friction device (21) has at least one friction element (22) and at least one friction surface (23) which are pretensioned against one another in the axial direction (A) by applying force to form the friction-locked operative connection, characterized in that a tensioning device (24) is provided which is associated with the bearing device (15) and the friction device (21) and has at least one tensioning element (25) by means of which the friction device (21) and the at least one rolling bearing (16) are respectively axially pretensioned by applying force wherein a radially inner surface of the friction element (22) engages a radially outer surface of the clutch hub (2)

characterized in that one end of the at least one tensioning element (25) brings about a first axial force (F1) on the friction device (21) and the other end brings about a second axial force (F2) which is opposite the first axial force (F1) and is applied to the outer ring (17) and/or the inner ring (18) of the at least one rolling bearing (16).

2. The clutch device (1) according to claim 1, characterized in that the friction element (22) is connected to the clutch hub (2) in a torque-proof manner and can be displaced in the axial direction (A) relative to the clutch hub (2), wherein in the axial direction (A), one end of the tensioning element (25) acts on a rear side of the friction element (22) and the other end acts on the outer ring (17) of the rolling bearing (16).

3. The clutch device (1) according to claim 1, characterized in that the bearing pin (19) is connected to the clutch flange (3) in a torque-proof manner by means of a radial plate (29) extending in the radial direction (R), wherein the friction surface (23) is arranged on the radial plate (29).

4. The clutch device (1) according to claim 1 wherein the friction element (22) includes a friction lining carrier (27) fixed to the clutch hub (2) and a friction lining (26) carried by the friction lining carrier (27) and configured to engage the friction surface (23).

5. The clutch device (1) according to claim 4 wherein the tensioning device (24) engages the friction element (22) a first point and engages the clutch hub (2) at a second point, the first point further from the clutch rotational axis (D) than the second point.

6. The clutch device (1) according to claim 5 wherein a radially innermost portion of the tensioning device 24 engages a shoulder formed in a radially outer surface of the clutch hub (2).

7. The clutch device (1) according to claim 1 wherein the tensioning device (24) engages the friction element (22) a first point and engages the clutch hub (2) at a second point, the first point further from the clutch rotational axis (D) than the second point.

8. The clutch device (1) according to claim 7 wherein a radially innermost portion of the tensioning device 24 engages a shoulder formed in a radially outer surface of the clutch hub (2).

9. A clutch device (1) for torsionally flexible torque transmission, comprising:
a clutch hub (2) which is located radially inside with respect to a clutch rotational axis (D) and associated with a hub side (N) of the clutch device (1);
a clutch flange (3) located radially outside and associated with a flange side (F) of the clutch device (1);

a spring device (10) by means of which the hub side (N) and the flange side (F) are elastically supported against each other in the circumferential direction in a torque-transmitting manner, for which purpose the spring device (10) has at least one spring element (11) which is supported in the circumferential direction at one end on the clutch hub (2) and at the other end on the clutch flange (3);

a bearing device (15) by means of which the hub side (N) and the flange side (F) are radially supported against one another and mounted to rotate around the clutch rotational axis (D), for which purpose the bearing device (15) has at least one rolling bearing (16) on the outer ring (17) of which the clutch hub (2) is radially supported and the inner ring (18) of which is radially supported on a bearing pin (19) associated with the flange side (F); and, a friction device (21) by means of which the hub side (N) and the flange side (F) are operatively connected to one other in a friction-locked and torque-transmitting manner in the circumferential direction, for which purpose the friction device (21) has at least one friction element (22) and at least one friction surface (23) which are pretensioned against one another in the axial direction (A) by applying force to form the friction-locked operative connection, characterized in that a tensioning device (24) is provided which is associated with the bearing device (15) and the friction device (21) and has at least one tensioning element (25) by means of which the friction device (21) and the at least one rolling bearing (16) are respectively axially pretensioned by applying force wherein the friction element (22) includes a friction lining carrier (27) fixed to the clutch hub (2) and a friction lining (26) carried by the friction lining carrier (27) and configured to engage the friction surface (23)

wherein the tensioning device (24) engages the friction element (22) a first point and engages the clutch hub (2) at a second point, the first point further from the clutch rotational axis (D) than the second point wherein a radially innermost portion of the tensioning device 24 engages a shoulder formed in a radially outer surface of the clutch hub (2).

10. The clutch device (1) according to claim 9, characterized in that one end of the at least one tensioning element (25) brings about a first axial force (F1) on the friction device (21) and the other end brings about a second axial force (F2) which is opposite the first axial force (F1) and is applied to the outer ring (17) and/or the inner ring (18) of the at least one rolling bearing (16).

11. The clutch device (1) according to claim 9, characterized in that the friction element (22) is connected to the clutch hub (2) in a torque-proof manner and can be displaced in the axial direction (A) relative to the clutch hub (2), wherein in the axial direction (A), one end of the tensioning element (25) acts on a rear side of the friction element (22) and the other end acts on the outer ring (17) of the rolling bearing (16).

12. The clutch device (1) according to claim 9, characterized in that the bearing pin (19) is connected to the clutch flange (3) in a torque-proof manner by means of a radial plate (29) extending in the radial direction (R), wherein the friction surface (23) is arranged on the radial plate (29).

13. A clutch device (1) for torsionally flexible torque transmission, comprising:

a clutch hub (2) which is located radially inside with respect to a clutch rotational axis (D) and associated with a hub side (N) of the clutch device (1);

a clutch flange (3) located radially outside and associated with a flange side (F) of the clutch device (1);

a spring device (10) by means of which the hub side (N) and the flange side (F) are elastically supported against each other in the circumferential direction in a torque-transmitting manner, for which purpose the spring device (10) has at least one spring element (11) which is supported in the circumferential direction at one end on the clutch hub (2) and at the other end on the clutch flange (3);

a bearing device (15) by means of which the hub side (N) and the flange side (F) are radially supported against one another and mounted to rotate around the clutch rotational axis (D), for which purpose the bearing device (15) has at least one rolling bearing (16) on the outer ring (17) of which the clutch hub (2) is radially supported and the inner ring (18) of which is radially supported on a bearing pin (19) associated with the flange side (F); and, a friction device (21) by means of which the hub side (N) and the flange side (F) are operatively connected to one other in a friction-locked and torque-transmitting manner in the circumferential direction, for which purpose the friction device (21) has at least one friction element (22) and at least one friction surface (23) which are pretensioned against one another in the axial direction (A) by applying force to form the friction-locked operative connection, characterized in that a tensioning device (24) is provided which is associated with the bearing device (15) and the friction device (21) and has at least one tensioning element (25) by means of which the friction device (21) and the at least one rolling bearing (16) are respectively axially pretensioned by applying force wherein the tensioning device (24) engages the friction element (22) a first point and engages the clutch hub (2) at a second point, the first point further from the clutch rotational axis (D) than the second point wherein a radially innermost portion of the tensioning device 24 engages a shoulder formed in a radially outer surface of the clutch hub (2).

14. The clutch device (1) according to claim 13, characterized in that one end of the at least one tensioning element (25) brings about a first axial force (F1) on the friction device (21) and the other end brings about a second axial force (F2) which is opposite the first axial force (F1) and is applied to the outer ring (17) and/or the inner ring (18) of the at least one rolling bearing (16).

15. The clutch device (1) according to claim 13, characterized in that the friction element (22) is connected to the clutch hub (2) in a torque-proof manner and can be displaced in the axial direction (A) relative to the clutch hub (2), wherein in the axial direction (A), one end of the tensioning element (25) acts on a rear side of the friction element (22) and the other end acts on the outer ring (17) of the rolling bearing (16).

16. The clutch device (1) according to claim 13, characterized in that the bearing pin (19) is connected to the clutch flange (3) in a torque-proof manner by means of a radial plate (29) extending in the radial direction (R), wherein the friction surface (23) is arranged on the radial plate (29).

* * * * *